(12) United States Patent
Wedig et al.

(10) Patent No.: US 11,562,434 B2
(45) Date of Patent: Jan. 24, 2023

(54) NOTIFICATION OF THE CONDITION OF A PROPERTY

(71) Applicant: oneEvent Technologies, Inc., Mount Horeb, WI (US)

(72) Inventors: Kurt J. Wedig, Mt. Horeb, WI (US); Daniel Ralph Parent, Mount Horeb, WI (US)

(73) Assignee: OneEvent Technologies, Inc., Mount Horeb, WI (US)

( * ) Notice: Subject to any disclaimer, the term of this patent is extended or adjusted under 35 U.S.C. 154(b) by 615 days.

(21) Appl. No.: 15/375,686

(22) Filed: Dec. 12, 2016

(65) Prior Publication Data

US 2017/0301030 A1    Oct. 19, 2017

Related U.S. Application Data

(63) Continuation of application No. 14/596,683, filed on Jan. 14, 2015, now abandoned, which is a continuation of application No. 14/288,177, filed on May 27, 2014, now abandoned.

(60) Provisional application No. 61/829,399, filed on May 31, 2013.

(51) Int. Cl.
  *G06Q 40/08* (2012.01)
  *G08B 21/18* (2006.01)

(52) U.S. Cl.
  CPC .......... *G06Q 40/08* (2013.01); *G08B 21/182* (2013.01)

(58) Field of Classification Search
  None
  See application file for complete search history.

(56) References Cited

U.S. PATENT DOCUMENTS

| 7,665,251 | B1 | 2/2010 | Lang et al. | |
| 8,289,160 | B1* | 10/2012 | Billman | G08B 21/18 |
| | | | | 340/540 |
| 8,650,048 | B1 | 2/2014 | Hopkins et al. | |
| 2002/0111725 | A1 | 8/2002 | Burge | |
| 2008/0065427 | A1* | 3/2008 | Helitzer | G06Q 40/08 |
| | | | | 705/4 |
| 2009/0132290 | A1 | 5/2009 | Patton | |
| 2009/0135009 | A1* | 5/2009 | Little | G06Q 10/00 |
| | | | | 340/540 |
| 2009/0204447 | A1 | 8/2009 | Tucker et al. | |
| 2010/0241464 | A1* | 9/2010 | Amigo | G06Q 40/08 |
| | | | | 705/4 |
| 2010/0324945 | A1* | 12/2010 | Hessing | G06Q 40/06 |
| | | | | 705/4 |
| 2011/0213628 | A1 | 9/2011 | Peak et al. | |

(Continued)

OTHER PUBLICATIONS

Final Office Action received for U.S. Appl. No. 14/596,683 dated Sep. 14, 2015, 14 pages.

(Continued)

*Primary Examiner* — William J Jacob

(57) ABSTRACT

A method includes receiving, at an insurance provider server and from at least one sensor located at an insured property, sensor data indicative of an insurance risk associated with the insured property. The method also includes determining, based at least in part on the received sensor data, a risk-adjusted insurance premium for an insurance account associated with the insured property. The risk-adjusted insurance premium compensates for the insurance risk associated with the insured property.

20 Claims, 5 Drawing Sheets

(56) References Cited

U.S. PATENT DOCUMENTS

| | | |
|---|---|---|
| 2011/0241877 A1 | 10/2011 | Wedig et al. |
| 2012/0016695 A1 | 1/2012 | Bernard et al. |
| 2012/0028680 A1* | 2/2012 | Breed .................. B60N 2/0232 455/556.1 |
| 2012/0072243 A1* | 3/2012 | Collins .................. G06Q 10/10 705/4 |
| 2012/0123806 A1 | 5/2012 | Schumann et al. |
| 2013/0096954 A1 | 4/2013 | Bodas |
| 2013/0317736 A1* | 11/2013 | Fernandes ............ G08G 5/0039 701/400 |
| 2014/0136242 A1* | 5/2014 | Weekes .................. G06Q 40/08 705/4 |
| 2014/0156323 A1 | 6/2014 | Prieto |
| 2014/0257862 A1 | 9/2014 | Billman et al. |
| 2014/0257864 A1 | 9/2014 | Billman |
| 2014/0379385 A1* | 12/2014 | Duncan .................. G06Q 40/08 705/4 |
| 2015/0025917 A1 | 1/2015 | Stempora |
| 2015/0096352 A1* | 4/2015 | Peterson ............. G08B 21/182 73/31.02 |
| 2016/0063635 A1* | 3/2016 | Collazo .................. G06Q 40/08 705/4 |

OTHER PUBLICATIONS

Non-Final Office Action received for U.S. Appl. No. 14/288,177 dated Nov. 5, 2015, 16 pages.
Non-Final Office Action received for U.S. Appl. No. 14/596,683 dated Apr. 8, 2015, 14 pages.

\* cited by examiner

NOTIFICATION OF THE CONDITION OF A PROPERTY

CROSS-REFERENCE TO RELATED APPLICATIONS

The present application is a continuation of U.S. application Ser. No. 14/596,683, filed Jan. 14, 2015, which is a continuation of U.S. application Ser. No. 14/288,177; filed May 27, 2014, which claims priority to U.S. Provisional Application No. 61/829,399 filed on May 31, 2013, the entire disclosures of which are incorporated herein by reference.

BACKGROUND

When an insurance provider offers insurance for a home or business, they are taking on the risk that any damage or liability associated with that property can be offset by premium payments made by property owners. In order to create a good balance between offering competitive prices and managing risk, an insurance provider may wish to assess the relative risk of each potential insurable property. Then, properties with lower risk may be offered lower premiums while higher-risk properties are offered higher premiums to compensate for the higher risk. Unfortunately, the information that is available to a provider may not be adequate in assessing the actual risk associated with a particular property. For example, a provider may assess all young homeowners as higher risk than middle-aged homeowners because the provider lacks the information to assess which young homeowners are more diligent in maintenance and safety behaviors than their older counterparts. As another example, a provider may assess two house insurance plans as having equal risk despite the fact that one house is left vacant for long periods of time, increasing its risk for damage from burglary, natural disaster, and liability than the continuously occupied house.

SUMMARY

An illustrative method involves an insurance provider receiving information about an insured property from a sensory node located in an area of the property, where the information is indicative of risk associated with the property. Based on the received information, the insurance provider determines a risk-adjusted insurance premium for the property to adjust for the indicated risk.

An illustrative node includes a transceiver and a processor operatively coupled to the transceiver. The transceiver is configured to receive readings from one or more sensors around an area of a structure. The processor is configured to determine risk information from the received readings and to cause the transceiver to provide the determined risk information to an insurance server.

An illustrative insurance server includes a communication interface and a processor. The interface is configured to receive sensor readings from a node at an insured property, where the sensor readings are indicative of risk information about the property. The processor is programmed to determine a risk-adjusted insurance premium amount for an insurance plan associated with the property based on the indicated risk information.

Another illustrative method involves receiving, at a node in an area of a property, a signal that is indicative of conditions at the property. The signal is processed to determine a risk value associated with the conditions at the property indicated by the signal. If the determined risk value has a particular relation to a predetermined risk value, then the node transmits an indication of the determined risk value to an insurance provider.

An illustrative non-transitory computer-readable medium having computer-readable instructions stored thereon is also provided. If executed by a processor of a node, the computer readable instructions cause the node to receive sensor readings indicative of conditions at a property and to determine a risk value associated with the conditions of the property based on the sensor readings. Also, when executed, the computer readable instructions cause the node to transmit an indication of the determined risk value to an insurance provider.

Another illustrative non-transitory computer-readable medium has computer-readable instructions stored thereon. If executed by an insurance server, the computer readable instructions cause the server to receive risk information associated with a property from a sensory node in the area of the property and to determine a risk-adjusted insurance premium for an insurance plan associated with the property.

Another illustrative method includes receiving, at an insurance provider server and from at least one sensor located at an insured property, sensor data indicative of an insurance risk associated with the insured property. The method also includes determining, based at least in part on the received sensor data, a risk-adjusted insurance premium for an insurance account associated with the insured property. The risk-adjusted insurance premium compensates for the insurance risk associated with the insured property.

An illustrative insurance provider server includes a memory and a processor operatively coupled to the memory. The memory is configured to store sensor data received from at least one sensor located at an insured property. The sensor data is indicative of an insurance risk associated with the insured property. The processor is configured to determine, based at least in part on the received sensor data, a risk-adjusted insurance premium for an insurance account associated with the insured property. The risk-adjusted insurance premium compensates for the insurance risk associated with the insured property.

An illustrative non-transitory computer-readable medium has instructions stored thereon for execution by a computing device. The instructions include instructions to receive sensor data from at least one sensor located at an insured property. The sensor data is indicative of an insurance risk associated with the insured property. The instructions also include instructions to determine, based at least in part on the received sensor data, a risk-adjusted insurance premium for an insurance account associated with the insured property. The risk-adjusted insurance premium compensates for the insurance risk associated with the insured property.

Other principal features and advantages will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings.

DETAILED DESCRIPTION

Described herein are illustrative systems and methods for facilitating usage-based property insurance associated with a physical structure. An illustrative system can include one or more sensory nodes configured to detect and/or monitor conditions in and around the insured physical structure. An illustrative system can also include communication interfaces for connecting with systems associated with an insurance provider. As illustrative system can further include data processing and storage components for analyzing the detected/monitored condition data and determining risk information that can be used to adjust insurance premiums and payouts.

Figure 1:
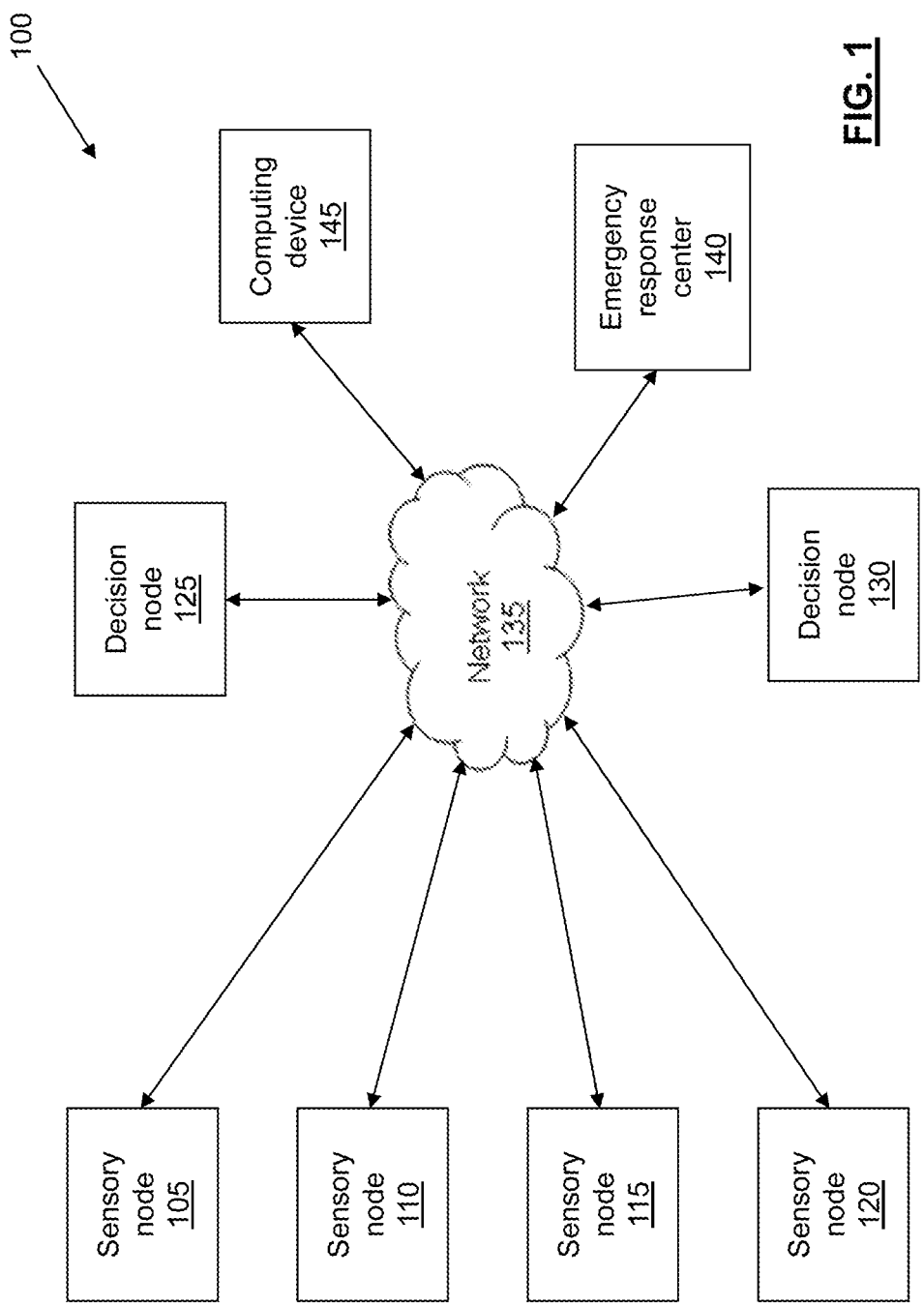
FIG. 1 is a block diagram illustrating a node system in accordance with an illustrative embodiment.

FIG. 1 is a block diagram of a detection system 100 in accordance with an illustrative embodiment. In alternative embodiments, detection system 100 may include additional, fewer, and/or different components. Detection system 100 includes a sensory node 104, a sensory node 110, a sensory node 114, and a sensory node 120. In alternative embodiments, additional or fewer sensory nodes may be included. Detection system 100 also includes a decision node 124 and a decision node 130. Alternatively, additional or fewer decision nodes may be included.

In an illustrative embodiment, sensory nodes 104, 110, 114, and 120 can be configured to detect any number of risk conditions. For example, the risk conditions can be a fire risk, a liability risk, an unoccupancy risk, an over-occupancy risk, a flood risk, a wind damage risk, a poison gas can risk, a structural integrity risk, an intrusion risk, an alarm tampering risk, and/or an occupancy demographic risk, among other examples. Sensory nodes 104, 110, 114, and 120 can be distributed throughout a structure. The structure can be a home, an office building, a commercial space, a store, a factory, or any other building or structure. As an example, a single story office building can have one or more sensory nodes in each office, each bathroom, each common area, etc. An illustrative sensory node is described in more detail with reference to FIG. 2.

Sensory nodes 104, 110, 114, and 120 can communicate with decision nodes 124 and 130 through a network 134. Network 134 can include a short-range communication network such as a Bluetooth™ network, a Zigbee™ network, etc. Network 134 can also include a local area network (LAN), a wide area network (WAN), a telecommunications network, the Internet, a public switched telephone network (PSTN), and/or any other type of communication network known to those of skill in the art. Network 134 can be a distributed intelligent network such that detection system 100 can make decisions based on sensory input from any nodes in the population of nodes. In an illustrative embodiment, decision nodes 124 and 130 can communicate with sensory nodes 104, 110, 114, and 120 through a short-range communication network. Decision nodes 124 and 130 can also communicate with an insurance server 140 through a telecommunications network, the Internet, a PSTN, etc. As such, when they risk condition is detected, insurance server 140 can be automatically notified. Insurance server 140 can be any type of computing, processing, or storage device, such as a cloud server, server system, computer, etc.

To communicate information associated with any risk conditions, a sensory node can provide an indication of the detection condition to decision node 124 and/or decision node 130. The indication can include an identification and/or location of the sensory node, a type of the detection condition, and/or a magnitude of the detection condition. The magnitude of the detection condition can include an estimated damage from the risk, a probability of the risk occurring, and a timing in which the risk is likely to occur. The indication of the detection condition can be used by decision node 124 and/or decision node 130 to determine insurance-premium adjustments described in more detail with reference to FIG. 5.

In an illustrative embodiment, sensory nodes 104, 110, 114, and 120 can also periodically provide status information to decision node 124 and/or decision node 130. The status information can include an identification of the sensory node, location information corresponding to the sensory node, information regarding battery life, and/or information regarding whether the sensory node is functioning properly. As such, decision nodes 124 and 130 can be used as a diagnostic tool to alert a system administrator or other user of any problems with sensory nodes 104, 110, 114, and 120. Decision nodes 124 and 130 can also communicate status information to one another for diagnostic purposes. The system administrator, the insurer, or other computing devices can also be alerted if any of the nodes of detection system 100 fail to timely provide status information according to a periodic schedule. In one embodiment, a detected failure or problem within detection system 100 can be communicated to the system administrator or other user via a text message or an e-mail.

In one embodiment, network 134 can include a redundant (or self-healing) mesh network centered around sensory nodes 104, 110, 114, and 120 and decision nodes 124 and 130. As such, sensory nodes 104, 110, 114, and 120 can communicate directly with decision nodes 124 and 130, or indirectly through other sensory nodes. As an example, sensory node 104 can provide status information directly to decision node 124. Alternatively, sensory node 104 can provide the status information to sensory node 114, sensory node 114 can provide the status information (relative to sensory node 104) to sensory node 120, and sensory node 120 can provide the status information (relative to sensory node 104) to decision node 124. The redundant mesh network can be dynamic such that communication routes can be determined on the fly in the event of a malfunctioning node. As such, in the example above, if sensory node 120 is down, sensory node 114 can automatically provide the status information (relative to sensory node 104) directly to decision node 124 or to sensory node 110 for provision to decision node 124. Similarly, if decision node 124 is down, sensory nodes 104, 110, 114, and 120 can be configured to convey status information directly or indirectly to decision node 130. The redundant mesh network can also be static such that communication routes are predetermined in the event of one or more malfunctioning nodes. Network 134 can receive/transmit messages over a large range as compared to the actual wireless range of individual nodes. Network 134 can also receive/transmit messages through various wireless obstacles by utilizing the mesh network capability of detection system 100. As an example, a message destined from an origin of node A to a distant destination of node Z (i.e., where node A and node Z are not in direct range of one another) may use any of the nodes between node A and node Z to convey the information. In one embodiment, the mesh network can operate within the 2.4 GHz range. Alternatively, any other range(s) may be used.

In an illustrative embodiment, each of sensory nodes 104, 110, 114, and 120 and/or each of decision nodes 124 and 130 can know its location. The location can be global positioning system (GPS) coordinates. In one embodiment, a computing device 144 can be used to upload the location to sensory nodes 104, 110, 114, and 120 and/or decision nodes 124 and 130. Computing device 144 can be a portable GPS system, a cellular device, a laptop computer, or any other type of communication device configured to convey the location. As an example, computing device 144 can be a GPS-enabled laptop computer. During setup and installation of detection system 100, a technician can place the GPS-enabled laptop computer proximate to sensory node 104. The GPS-enabled laptop computer can determine its current GPS coordinates, and the GPS coordinates can be uploaded to sensory node 104. The GPS coordinates can be uploaded to sensory node 104 wirelessly through network 134 or through a wired connection. Alternatively, the GPS coordinates can be manually entered through a user interface of sensory node 104. The GPS coordinates can similarly be uploaded to sensory nodes 110, 114, and 120 and decision nodes 124 and 130. In one embodiment, sensory nodes 104, 110, 114, and 120 and/or decision nodes 124 and 130 may be GPS-enabled for determining their respective locations. In one embodiment, each node can have a unique identification number or tag, which may be programmed during the manufacturing of the node. The identification can be used to match the GPS coordinates to the node during installation. Computing device 144 can use the identification information to obtain a one-to-one connection with the node to correctly program the GPS coordinates over network 134. In an alternative embodiment, GPS coordinates may not be used, and the location can be in terms of position with respect to a particular structure. For example, sensory node 104 may be located in room five on the third floor of a hotel, and this information can be the location information for sensory node 104. Regardless of how the locations are represented, detection system 100 can determine the detection route(s) based at least in part on the locations and a known layout of the structure.

In one embodiment, a zeroing and calibration method may be employed to improve the accuracy of the indoor GPS positioning information programmed into the nodes during installation. Inaccuracies in GPS coordinates can occur due to changes in the atmosphere, signal delay, the number of viewable satellites, etc., and the expected accuracy of GPS is usually about 6 meters. To calibrate the nodes and improve location accuracy, a relative coordinated distance between nodes can be recorded as opposed to a direct GPS coordinate. Further improvements can be made by averaging multiple GPS location coordinates at each perspective node over a given period (i.e., 4 minutes, etc.) during detection system 100 configuration. At least one node can be designated as a zeroing coordinate location. All other measurements can be made with respect to the zeroing coordinate location. In one embodiment, the accuracy of GPS coordinates can further be improved by using an enhanced GPS location band such as the military P(Y) GPS location band. Alternatively, any other GPS location band may be used.

Figure 2:
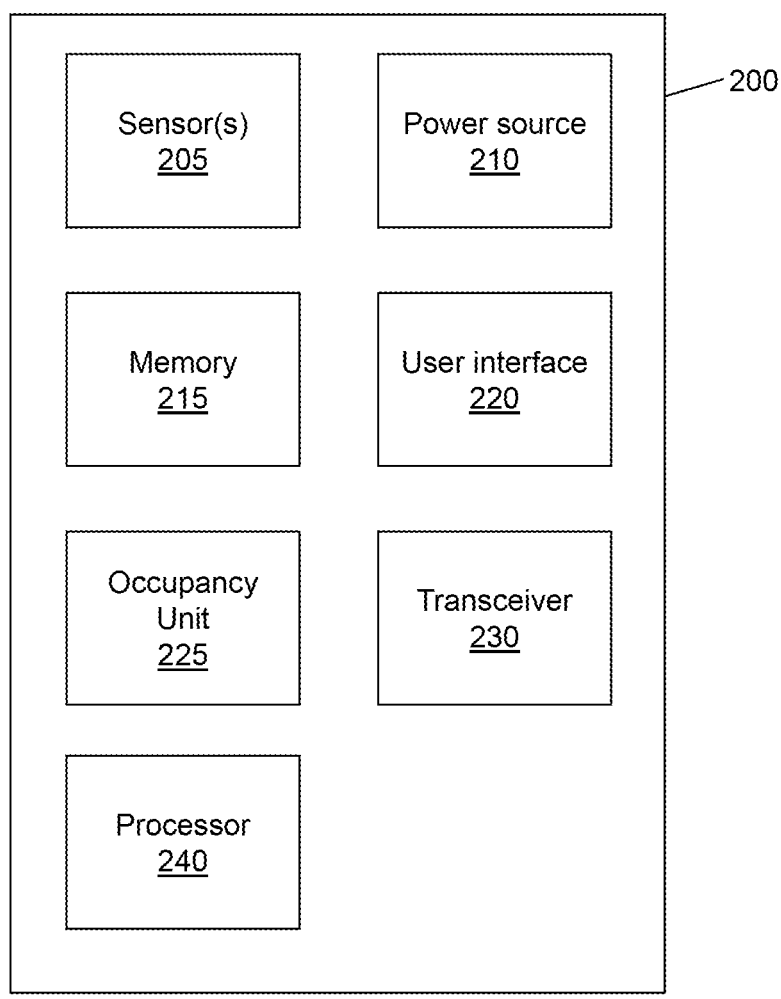
FIG. 2 is a block diagram illustrating a sensory node in accordance with an illustrative embodiment.

FIG. 2 is a block diagram illustrating a sensory node 200 in accordance with an illustrative embodiment. In alternative embodiments, sensory node 200 may include additional, fewer, and/or different components. Sensory node 200 includes sensor(s) 204, a power source 210, a memory 214, a user interface 220, an occupancy unit 224, a transceiver 230, a warning unit 234, and a processor 240. Sensor(s) 205 can include a smoke detector, a heat sensor, a chemical sensor, humidity sensor, wind sensor, vibration sensor, load sensor, and/or any other type of hazardous condition sensor known to those of skill in the art. In an illustrative embodiment, power source 210 can be a battery. Sensory node 200 can also be hard-wired to the structure such that power is received from the power supply of the structure (i.e., utility grid, generator, solar cell, fuel cell, etc.). In such an embodiment, power source 210 can also include a battery for backup during power outages.

Memory 215 can be configured to store identification information corresponding to sensory node 200. The identification information can be any indication through which other sensory nodes and decision nodes are able to identify sensory node 200. Memory 215 can also be used to store location information corresponding to sensory node 200. The location information can include global positioning system (GPS) coordinates, position within a structure, or any other information which can be used by other sensory nodes and/or decision nodes to determine the location of sensory node 200. In one embodiment, the location information may be used as the identification information. The location information can be received from computing device 145 described with reference to FIG. 1, or from any other source. Memory 215 can further be used to store communication information, such as routing information for a mesh network in which sensory node 200 is located such that sensory node 200 is able to forward information to appropriate nodes during normal operation and in the event of one or more malfunctioning nodes. Memory 215 can also be used to store historic risk assessment information and/or one or more detection messages generated by the detection of risk conditions. Memory 215 can further be used for storing adaptive pattern recognition algorithms and for storing compiled patterns.

User interface 220 can be used by a system administrator or other user to program and/or test sensory node 200. User interface 220 can include one or more controls, a liquid crystal display (LCD) or other display for conveying information, one or more speakers for conveying information, etc. User interface 220 can be used to upload location information to sensory node 200, to test sensory node 200 to ensure that sensory node 200 is functional, to adjust a volume level of sensory node 200, to silence sensory node 200, etc. User interface 220 can also be used to alert a user of a problem with sensory node 200 such as low battery power or a malfunction. User interface 220 can further include a button such that a user can report a risk condition and activate the detection system.

Occupancy unit 225 can be used to detect and/or monitor occupancy of a structure. As an example, occupancy unit 225 can detect whether one or more individuals are in a given room or area of a structure. A decision node can monitor this occupancy information and analyze occupancy patterns to determine potential risk conditions for the property. For example, if the system detects that one room in a house has not been occupied for a given period of time (e.g., 8 months), decision node may determine that this unoccupied room is at greater risk damage from slow-acting causes (e.g., mold, infestation, leaks, etc.) since the residents might not notice and resolve problems in that room promptly. As another example, occupancy unit 225 can determine that there are generally no individuals in a property between the hours of 8:00 am and 6:00 pm on Mondays through Fridays, and, based on that occupancy pattern, determine that the property has a decreased liability because the reduced occupancy leaves less time for occupants to damage the property.

Occupancy unit 225 can detect/monitor the occupancy using one or more motion detectors to detect movement. Occupancy unit 224 can also use a video or still camera and video/image analysis to determine the occupancy. Occupancy unit 225 can also use respiration detection by detecting carbon dioxide gas emitted as a result of breathing. An example high sensitivity carbon dioxide detector for use in respiration detection can be the MG-811 CO2 sensor manufactured by Henan Hanwei Electronics Co., Ltd. based in Zhengzhou, China. Alternatively, any other high sensitivity carbon dioxide sensor may be used. Occupancy unit 225 can also be configured to detect methane, or any other gas which may be associated with human presence.

Occupancy unit 225 can also use infrared sensors to detect heat emitted by individuals. In one embodiment, a plurality of infrared sensors can be used to provide multidirectional monitoring. Alternatively, a single infrared sensor can be used to scan an entire area. The infrared sensor(s) can be combined with a thermal imaging unit to identify thermal patterns and to determine whether detected occupants are human, feline, canine, rodent, etc. The infrared sensors can also be used to determine if occupants are moving or still, to track the direction of occupant traffic, to track the speed of occupant traffic, to track the volume of occupant traffic, etc. This information can be used to alert emergency responders to a panic situation, or to a large captive body of individuals. Activities occurring prior to a risk condition can be sensed by the infrared sensors and recorded by the detection system. As such, suspicious behavioral movements occurring prior to a risk condition can be sensed and recorded. For example, if the detection condition was maliciously caused, the recorded information from the infrared sensors can be used to determine how quickly the area was vacated immediately prior to the detection condition. Infrared sensor based occupancy detection is described in more detail in an article titled "Development of Infrared Human Sensor" in the Matsushita Electric Works (MEW) Sustainability Report 2004, the entire disclosure of which is incorporated herein by reference.

Occupancy unit 225 can also use audio detection to identify noises associated with occupants such as snoring, respiration, heartbeat, voices, etc. The audio detection can be implemented using a high sensitivity microphone which is capable of detecting a heartbeat, respiration, etc. from across a room. Any high sensitivity microphone known to those of skill in the art may be used. Upon detection of a sound, occupancy unit 225 can utilize pattern recognition to identify the sound as speech, a heartbeat, respiration, snoring, etc. Occupancy unit 225 can similarly utilize voice recognition and/or pitch tone recognition to distinguish human and non-human occupants and/or to distinguish between different human occupants. As such, occupancy unit 225 can determine whether an occupant is a baby, a small child, an adult, a dog, etc. Occupancy unit 225 can also detect occupants using scent detection. An example sensor for detecting scent is described in an article by Jacqueline Mitchell titled "Picking Up the Scent" and appearing in the August 2008 Tufts Journal, the entire disclosure of which is incorporated herein by reference.

Transceiver 230 can include a transmitter for transmitting information and/or a receiver for receiving information. As an example, transceiver 230 of sensory node 200 can receive status information, occupancy information, detection condition information, historical detection data, etc. from a first sensory node and forward the information to a second sensory node, to a decision node, or to an external server. Transceiver 230 can also be used to transmit information corresponding to sensory node 200 to another sensory node or a decision node. For example, transceiver 230 can periodically transmit occupancy information to a decision node such that the decision node has the occupancy information at all times. Alternatively, transceiver 230 can be used to transmit the occupancy information to the decision node along with an indication of the detection condition. Transceiver 230 can also be used to receive instructions regarding appropriate detection routes and/or the detection routes from a decision node. Alternatively, the detection routes can be stored in memory 215 and transceiver 230 may only receive an indication of which detection route to convey.

Processor 240 can be operatively coupled to each of the components of sensory node 200, and can be configured to control interaction between the components. For example, if a risk condition is detected by sensor(s) 205, processor 240 can cause transceiver 230 to transmit an indication of the risk condition to a decision node. In response, transceiver 230 can receive other risk information from the decision node regarding conditions at other sensors or nodes. Processor 240 can interpret the received information, determine the full risk conditions at the property, and cause transceiver 230 to convey the detected risk conditions to insurance server. Processor 240 can also receive inputs from user interface 220 and take appropriate action. Processor 240 can further be coupled to power source 210 and used to detect and indicate a power failure or low battery condition. In one embodiment, processor 240 can also receive manually generated alarm inputs from a user through user interface 220. As an example, if a fire is accidently started in a room of a structure, a user may press an alarm activation button on user interface 220, thereby signaling a risk condition and activating warning systems. In such an embodiment, in the case of accidental alarm activation, sensory node 200 may inform the user that he/she can press the alarm activation button a second time to disable the alarm. After a predetermined period of time (i.e., 5 seconds, 10 seconds, 30 seconds, etc.), the detection condition may be conveyed to other nodes and/or an emergency response center through the network.

Figure 3:
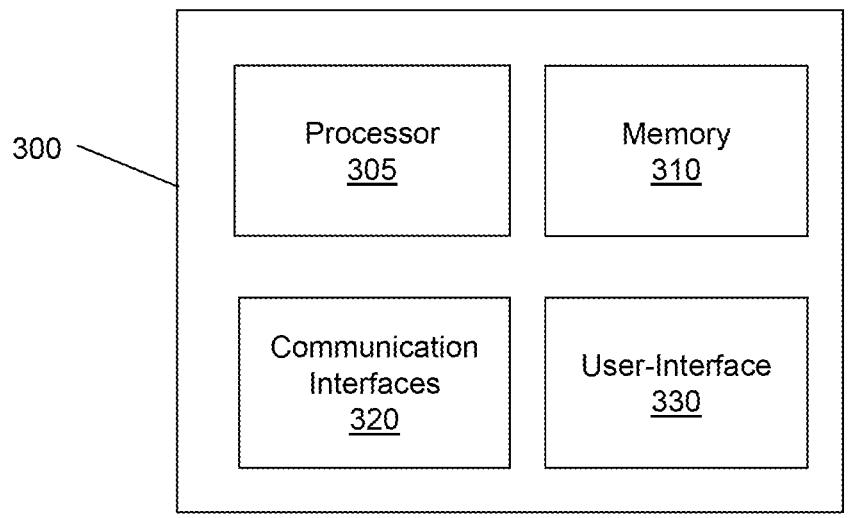
FIG. 3 is a block diagram illustrating an insurance server in accordance with an illustrative embodiment.

FIG. 3 is a block diagram illustrating an insurance server 300 in accordance with an illustrative embodiment. In alternative embodiments, insurance server 300 may include additional, fewer, and/or different components. Insurance server 300 includes a processor 305, a memory 310, communication interfaces 320, and a user-interface 330.

Memory 310 can be configured to store historical sensor data, risk data, detection and monitoring algorithms, insurance account information, and/or program instructions for execution by processor 305. Communication interfaces 320, may include, for example, wireless chipsets, antennas, wired ports, signal converters, communication protocols, and other hardware and software for interfacing with external systems via wired or wireless networks over public or private communication links. Devices in the example system may receive user-input and user-commands via user-interface 330, which may include, for instance, remote controllers, touch-screen input, actuation of buttons/switches, voice input, and other user-interface elements. Processor 305 can be operatively coupled to each of the components of insurance server 300, and can be configured to control interaction between the components.

Figure 4:
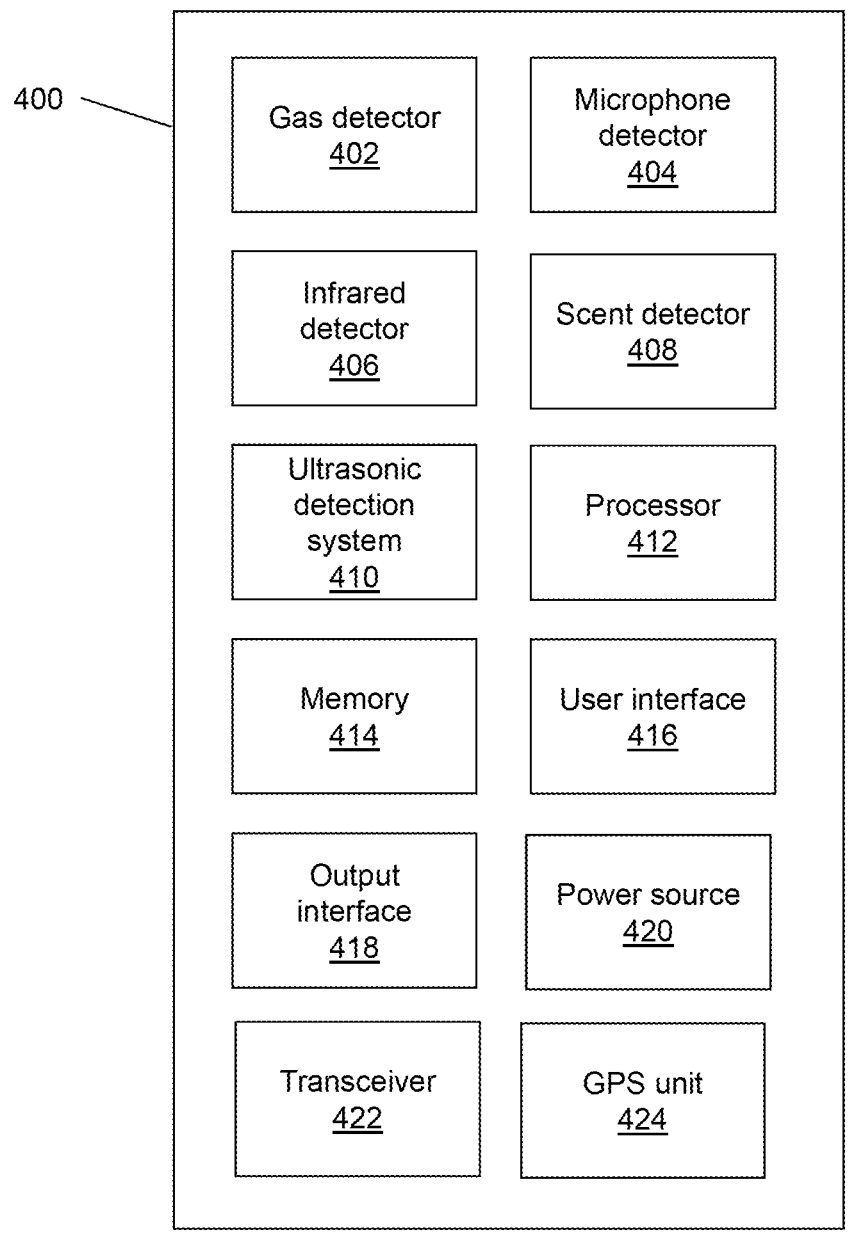
FIG. 4 is a block diagram illustrating a sensory unit in accordance with an illustrative embodiment.

FIG. 4 is a block diagram illustrating a sensor unit 400 in accordance with an illustrative embodiment. In one embodiment, the system herein can be implemented using a remote server that is in communication with a plurality of sensory nodes that are located in a dwelling. The remote server can be used to process information reported by the sensory nodes and to control the sensory nodes. In one embodiment, the remote server can replace the decision node(s) such that a given dwelling is only equipped with the sensory nodes. In such an embodiment, the system can be implemented using cloud computing techniques as known to those of skill in the art.

Sensor unit 400 includes a gas detector 402, a microphone detector 404, an infrared detector 406, a scent detector 408, an ultrasonic detection system 410, a processor 412, a memory 414, a user interface 416, an output interface 418, a power source 420, a transceiver 422, and a global positioning system (GPS) unit 424. In alternative embodiments, sensor unit 400 may include fewer, additional, and/or different components. In one embodiment, sensor unit 400 can be made from fire retardant materials and/or other materials with a high melting point or heat tolerance in the event that sensor unit 400 is used at the site of a fire. Alternatively, any other materials may be used to construct sensor unit 400. Gas detector 402, microphone detector 404, infrared detector 406, and scent detector 408 can be used to detect occupancy as described above with reference to occupancy unit 224 of FIG. 2.

Ultrasonic detection system 410 can be configured to detect human, animal, or object presence using ultrasonic wave detection. In one embodiment, ultrasonic detection system 410 can include a wave generator and a wave detector. The wave generator can emit ultrasonic waves into a room or other structure. The ultrasonic waves can reflect off of the walls of the room or other structure. The wave detector can receive and examine the reflected ultrasonic waves to determine whether there is a frequency shift in the reflected ultrasonic waves with respect to the originally generated ultrasonic waves. Any frequency shift in the reflected ultrasonic waves can be caused by movement of a person or object within the structure. As such, an identified frequency shift can be used to determine whether the structure is occupied. Alternatively, processor 412 may be used to identify frequency shifts in the reflected ultrasonic waves. In one embodiment, occupancy unit 224 described with reference to FIG. 2 can also include an ultrasonic detection system.

Processor 412 can be used to process detected signals received from gas detector 402, microphone detector 404, infrared detector 406, scent detector 408, and/or ultrasonic detection system 410. In an illustrative embodiment, processor 412 can utilize one or more signal acquisition circuits (not shown) and/or one or more algorithms to process the detected signals and determine occupancy data. In one embodiment, processor 412 can utilize the one or more algorithms to determine a likelihood that an occupant is present in a structure. For example, if the detected signals are low, weak, or contain noise, processor 412 may determine that there is a low likelihood that an occupant is present. The likelihood can be conveyed to a user of sensor unit 400 as a percentage, a description (i.e., low, medium, high), etc. Alternatively, processor 412 can determine the likelihood that an occupant is present and compare the likelihood to a predetermined threshold. If the likelihood exceeds the threshold, sensor unit 400 can alert the user to the potential presence of an occupant. If the determined likelihood does not exceed the threshold, sensor unit 400 may not alert the user.

In an illustrative embodiment, processor 412 can determine room conditions based on the combined input from each of gas detector 402, microphone detector 404, infrared detector 406, scent detector 408, and/or ultrasonic detection system 410. In an illustrative embodiment, the one or more algorithms used by processor 412 to determine conditions at the property can be weighted based on the type of sensor(s) that identify a condition at the property, the number of sensors that identify the condition, and/or the likelihood of the condition corresponding to each of the sensor(s) that identified the condition. As an example, detection by ultrasonic detection system 410 (or any of the other detectors) may be given more weight than detection by scent detector 408 (or any of the other detectors). As another example, processor 412 may increase the likelihood of a condition as the number of detectors that detected any sign of the condition increases. Processor 412 can also determine the likelihood of a particular condition based on the likelihood corresponding to each individual sensor. For example, if all of the detectors detect conditions with a low likelihood of accuracy, the overall likelihood of a present occupant may be low. In one embodiment, any sign of a particular condition by any of the sensors can cause processor 412 to alert the insurance provider. Similarly, processor 412 can provide the user with information such as the overall likelihood that a particular risk factor exists, the likelihood of the risk factor associated with each sensor, the number of sensors that detected the factor, the type of sensors that detected the risk factor, etc. such that the user can make an informed decision.

In addition to the sensors shown in FIG. 4, a sensory node according to an illustrative embodiment may include or be capable of connecting to various other sensors, such as a climate control unit, and includes a water flow sensor, flood sensor, a wind sensor, and a hail/rain sensor. Instructions and/or data can also be provided to climate control unit, water flow sensor, flood sensor, wind sensor, and hail/rain sensor from decision node 124, sensory node 104, and/or computing device 144 via network 134. In an alternative embodiment, climate control unit, water flow sensor, flood sensor, wind sensor, and hail/rain sensor may communicate directly with decision node 124, sensory node 104, and computing device 144 through a wired or wireless connection outside of network 134.

A climate control unit can be a thermostat or other unit that is used to control the temperature within a building by controlling heating units and air conditioning units for the building. In one embodiment, decision node 124 and/or sensory node 104 of a sensor system can include a thermometer or other known apparatus for determining temperature. The decision node 124 and/or sensory node 104 can also include data regarding the usual or normal temperature for one or more different rooms of the building in which the system is installed. The data can be based on sensed temperature data that is accumulated over time. The data can also be received from a user through the user interface of the system as threshold temperatures for various rooms of the building. For example, the user may indicate that the minimum temperature for a bedroom of the building is 68 degrees Fahrenheit (F) and that the minimum temperature for the basement of the building is 60 degrees F. As another example, the user may indicate that the maximum temperature for the bedroom of the building is 72 degrees F., the maximum temperature for a kitchen of the building is 76 degrees F., and the maximum temperature for a bathroom of the building is 74 degrees F.

In an illustrative embodiment, the temperature data is used by decision node 124 and/or sensory node 104 to control climate control unit such that the desired temperature or normal temperature is maintained throughout the various rooms of the building. As a result, there can be numerous locations throughout the building at which decision/sensory nodes are installed, and the temperature can be controlled through each of these locations. This is in contrast to many traditional systems in which a single, a centrally located thermostat is used to control the temperature for an entire building. In one embodiment, the user can also manually control a climate control unit by sending instructions via the user interface of a sensor system. For example, the user may leave on vacation during the winter and forget to turn the heat down prior to departure. With the present system, the user can log in to the user interface and provide an instruction to lower the heat from 72 degrees F. to 60 degrees F. for the entire building. The instruction can be received by decision node 124 and/or sensory node 104 via network 134. Responsive to receiving the instruction, decision node 124 and/or sensory node 104 can control the climate control unit to implement the temperature change in the building.

In one embodiment, the user can be provided a notification if the temperature in a given room of the building exceeds a set temperature or an expected temperature by a threshold amount. For example, if the temperature in a bedroom exceeds the expected temperature by 10 degrees, the user may be provided a notification. The notification can be a visual and/or audio notification from the decision/sensory node, or the notification may be in the form of an e-mail, text message, telephone call, etc. to a computing device of the user. In one embodiment, one or more neighbors of the user may also be provided with such a notification. The threshold amount and form of notification can be specified by the user during setup of the detection system. In an alternative embodiment, decision node 124 and/or sensory node 104 may include the functionality of a thermostat such that decision node 124 and/or sensory node 104 controls the heating and air conditioning units directly. In such an embodiment, the building may not include a centrally located climate control unit.

A water flow sensor can be used to determine if continuous water flow is occurring within a dwelling. Such detection is beneficial in both an environmental sense and also as a method of predicting a home flooding catastrophe. In an illustrative embodiment, a sensor system can learn normal water flow patterns of the building based on sensor data received from the water flow sensor and/or based on data received from the user. The learned/received data can include an identification of times of day when it is generally expected that there will be little or no water flow, times of day when it is generally expected that there will be heavy water flow, an identification of days of the week on which water flow is expected to light or heavy, areas of the house where it is generally expected that there will be light or heavy water flow, etc. Abnormal water flow or excessive water flow can occur if a water pipe breaks, a garden hose is left on, a toilet runs continuously, a water faucet is left on, etc. In one embodiment, abnormal water flow can be detected if the water runs longer than a predetermined threshold amount of time such as a number of minutes or a number of hours. The threshold can be set by the user via the user interface, or established by the system, depending on the embodiment. In the event of detection of abnormal water flow, the user can be provided with a notification. The notification can be a visual and/or audio notification from the decision/sensory node, or the notification may be in the form of an e-mail, text message, telephone call, etc. to a computing device of the user. In one embodiment, one or more neighbors of the user may also be provided with such a notification.

In an illustrative embodiment, the water flow sensor can be an acoustic sensor mounted on or near a water pipe. In one embodiment, the water flow sensor can include a microphone, a processor, a memory, and a transmitter. The microphone can be mounted on, near, or around a water pipe to detect the sound of running water within the pipe. In an illustrative embodiment, the microphone is part of a sleeve that wraps around the water pipe. The microphone can be acoustically isolated from environmental noises via insulation, noise cancellation techniques, or any other techniques known to those of skill in the art. The processor of the water flow sensor can receive volume and frequency characteristics of sounds received through the microphone. The memory can store the data, and the transmitter, which can be wired or wireless, can transmit the measured values to a decision node, a sensory node, or a local/remote server, which in turn can determine whether there is water flow, the amount of water flow, and whether the water flow is normal or abnormal. Alternatively, the processor of the water flow sensor can make such determinations. If the water flow is abnormal, a notification is provided as discussed above. The water pipe that is monitored can be the main water line coming into the home/building, or any other water pipe in the building, including the water supply to a sprinkler system designed to combat fire. In one embodiment, the water flow sensor can be installed on each water pipe in the building.

In one embodiment, the water flow sensor may also include a thermistor or other temperature detection device to monitor a temperature of the water pipe. The temperature of the water pipe can also be used to detect water flow and determine whether the water flow is normal or abnormal. For example, if the hot water faucet is left on, the thermistor may sense that the temperature of the water pipe is high for an extended period of time, which is an indication that hot water is running. The thermistor may similarly detect that cold water is running if the temperature of the water pipe is low for an extended period of time. In an illustrative embodiment, the thermistor can be used in conjunction with the microphone to help prevent false alarms. For example, if the microphone data is inconclusive, the system may relay on the thermistor data to help determine whether water is flowing through a pipe. Alternatively, the thermistor may be used independent of the microphone.

The flood sensor can be used to detect a flood in accordance with an illustrative embodiment. As an example, one or more flood sensors can be placed in areas on a lowest level of a building where flooding may occur, such as a basement generally, near a sump pump in a basement, in a bathroom within the basement, near a washing machine, etc. The flood sensor may also be placed in upper levels of the building in or near bathrooms, laundry rooms, kitchens, and/or other areas that are potentially at risk of flooding. The flood sensor can detect flooding that occurs as a result of internal water leaks or water from outside that flows into a building. In one embodiment, the flood sensor can measure the electrical conductivity between two or more sensors or probes of the flood sensor that are placed at or near floor level to detect the presence of water. Any water detecting probes or sensing components known to those of skill in the art can be used.

In addition to the sensors, the flood sensor can include a processor, a transmitter, and a memory. In an illustrative embodiment, upon detection of water by the flood sensor, the processor of the flood sensor can receive an indication that water has been detected, store the information in memory, and cause the transmitter to transmit data to a decision node, sensory node, or local/remote server via wireless and/or wired communication. In response to detection of water and a potential flood, the user can be provided with a notification. The notification can be a visual and/or audio notification from the decision/sensory node, or the notification may be in the form of an e-mail, text message, telephone call, etc. to a computing device of the user. In one embodiment, one or more neighbors of the user may also be provided with such a notification.

The wind sensor can be used to detect wind proximate to a building in accordance with an illustrative embodiment. As an example one or more wind sensors can be placed in areas on or near an exterior of a building, such as a fence post, a roof, a dedicated post, etc. The wind sensor can be used to detect high winds that may potentially damage an exterior of a building, such as siding, roofing, etc. In one embodiment, the wind sensor can be implemented in part as a hot wire anemometer. A hot wire anemometer uses a very fine wire (generally on the order of several micrometers) electrically heated up to some temperature above the ambient temperature. Air flowing past the wire has a cooling effect on the wire. As the electrical resistance of metals such as tungsten, for example, is dependent upon the temperature of the metal, a relationship can be obtained between the resistance of the wire and the flow speed such that the flow speed of the wind can be determined.

Alternatively, the wind sensing components may be ultrasonic. Both wind speed and direction can be measured using an ultrasonic sensor. The ultrasonic sensor uses ultrasound to determine horizontal wind speed and direction. In one embodiment, an array of three equally spaced ultrasonic transducers on a horizontal plane can be used to ensure accurate wind measurement from all wind directions, without blind angles or corrupted readings. The ultrasonic wind sensor has no moving parts, which makes it maintenance free.

In addition to the sensors, the wind sensor can include a processor, a transmitter, and a memory. In an illustrative embodiment, upon detection of wind with a speed in excess of a threshold by the wind sensor, the processor of the wind sensor can receive an indication that high speed wind has been detected, store the data in memory, and can cause the transmitter to transmit the data to a decision node, sensory node, or local/remote server via wireless and/or wired communication. The wind speed threshold can be set by the user, or set by the system depending on the embodiment. In response to detection of the high speed wind, the user can be provided with a notification. The notification can be a visual and/or audio notification from the decision/sensory node, or the notification may be in the form of an e-mail, text message, telephone call, etc. to a computing device of the user. In one embodiment, one or more neighbors of the user may also be provided with such a notification.

The hail/rain sensor can be used to detect hail and/or heavy rain in accordance with an illustrative embodiment. As an example, one or more hail/rain sensors can be placed in areas on or near an exterior of a building, such as a fence post, a roof, a dedicated post, etc. In one embodiment, the hail/rain sensor can be a piezoelectric sensor that includes a round stainless steel cover mounted to a rigid frame. A piezoelectric detector is located beneath the cove, and the electronics of the system can be mounted beneath the detector. Hail and raindrops hit the sensor at their terminal velocity, which is a function of the hail/raindrop diameter. Measurement is based on the acoustic detection of each individual rain drop or piece of hail as it impacts the sensor cover. Larger raindrops or pieces of hail create a larger acoustic signal than smaller drops or pieces of hail. The piezoelectric detector converts the acoustic signals into voltages. Total rain/hail fall is calculated from the sum of the individual voltage signals per unit time and the known surface area of the sensor. This information is also used to calculate intensity and duration of rain or hail. In one embodiment, the sensor can also distinguish between hail and raindrops based on the acoustic differences when rain vs. hail contacts the sensor. Alternatively, the hail/rain sensor can be a fully shielded, low mass, thin, large surface sensor that includes a sensing element constructed of elastic electret film and a plurality of layers of polyester with aluminum electrodes. Crimped connectors can be used for connecting the electrodes to an electronic measuring device as known to those of skill in the art. Alternatively, any other hail/rain sensor known to those of skill in the art may be used.

In an alternative embodiment, the hail/rain sensor can be implemented in whole or in part as a tipping bucket sensor that is configured to detect precipitation. The tipping bucket sensor can be implemented as a rain/hail gauge that includes a funnel that collects and channels the precipitation into a small seesaw-like container. After a pre-set amount of precipitation falls, the lever tips, dumping the precipitation and sending an electrical signal via the processor and transmitter, as discussed below.

In addition to the sensors, the hail/rain sensor can include a processor, a transmitter, and a memory. In an illustrative embodiment, upon detection of hail/rain by the hail sensor, the processor of the hail sensor can receive an indication that hail/rain has been detected, store the data in memory, and cause the transmitter to transmit data to a decision node, sensory node, or local/remote server via wireless and/or wired communication. In response to detection of hail and/or rain that exceeds a hail/rain threshold, the user or an interested party such as the home insurer can be provided with a notification. The notification can be a visual and/or audio notification from the decision/sensory node, or the notification may be in the form of an e-mail, text message, telephone call, etc. to a computing device of the user. The hail/rain threshold can be set by the user or by the system, and can be based on the duration of hail/rain, the size of the hail/rain, and/or the amount of hail/rain.

In addition to the sensors discussed above, a detection system may also include indoor and/or outdoor temperature sensors, indoor and/or outdoor humidity sensors, lightning detection sensors, lightening range detection sensors, sun intensity sensors, freeze sensors, earthquake sensors, etc. that operate in a similar fashion to the sensors discussed above. As one example, the system may include a combined temperature and humidity sensor that detects relative humidity and temperature outputs. A lightning detector can function by detecting the electromagnetic pulse emitted by a lightning strike. By measuring the strength of the detected electromagnetic pulse, the lightning sensor can then estimate how far away the detected strike was. When exposed to multiple detected strikes, the lightning detector can be configured to calculate and extrapolate the direction of the storm's movement relative to its position (i.e., approaching, departing, or stationary). Sun intensity can be measured using optical sensors as known to those of skill in the art. An earthquake sensor can be implemented using an accelerometer as known to those of skill in the art.

Any of these additional sensors can include a processor, a transmitter, and a memory. In an illustrative embodiment, upon detection of a detected condition or a detected condition in excess of a threshold, the processor of the sensor can receive an indication that a condition has been detected, store the data in memory, and cause the transmitter to transmit data to a decision node, sensory node, or local/remote server via wireless and/or wired communication. In response to detection of the condition or a condition that exceeds a threshold, the user or other interested party can be provided with a notification. The notification can be a visual and/or audio notification from the decision/sensory node, or the notification may be in the form of an e-mail, text message, telephone call, etc. to a computing device of the user. In one embodiment, one or more neighbors of the user may also be provided with such a notification. The threshold, if used, can be set by the user or by the system.

In addition, any of the sensors described herein can be used in part for multi-parameter detection of a risk condition. In an illustrative embodiment, multi-parameter detection can refer to use of multiple environmental conditions as detected by differing types of sensors to determine when a risk condition occurs, and to prevent false alarms. In one embodiment, the detected environmental conditions can be compared against one other or compared against themselves over time to determine the presence or absence of flame, smoke, or other physical conditions that embody or are precursors to a fire or other detection condition. As such, the system can be configured to store and organize data collected by the various sensors of the system. That data can then be used to further refine the algorithms described herein in a manner that creates a more sensitive and more accurate detection condition detection algorithm.

In one embodiment, the collected data and the algorithm can be normalized for geographic differences, location of the sensor in specific places in a structure (such as a room with regularly elevated or diminished levels of a particular parameter—e.g., greater humidity in a bathroom or kitchen), etc. For example, the system may take geographic location and elevation into consideration when interpreting sensed humidity levels and temperatures. A building in a desert climate is more likely to have high temperature and low humidity than a building located in a mountainous region. The system can also utilize historical weather data to help evaluate sensor readings and determine whether a reading indicates a risk condition or a false alarm. For example, the system may know to expect elevated humidity levels during what is traditionally a rainy season for a given region. The system can also access a weather database to obtain upcoming forecast information such that the system can know whether a storm, temperature increase, temperature decrease, etc. is to be expected.

In an illustrative embodiment, any of the decision nodes or sensor nodes disclosed herein can include a silence switch, button, or other control such that the user can terminate an alarm/warning in the event of a false positive. The detection system can use activation of the silence switch to identify trends of when false positives occur, and to adjust system sensitivity based on the trends. As an example, a user may cook a frozen pizza at 6:00 pm in a kitchen of a house. The oven used to cook the pizza may generate smoke and cause a sensory node in the kitchen to identify a risk condition. In response, the user may press the silence button because there is not really a fire in the kitchen. The same occurrence may occur numerous times over the course of several months (i.e., a false positive may occur at around 6:00 pm due to smoke sensed by the kitchen sensory node, and the user may use the silence switch). As a result, the system can automatically adjust the sensitivity of the sensory node in the kitchen such that a small amount of smoke does not set off the alarm if the small amount of smoke is detected between 4:30-6:30 pm on weekdays, for example. The times during which the sensitivity is adjusted, the days on which sensitivity is adjusted, and the amount by which the sensitivity is adjusted can vary based on the specific implementation. In one embodiment, the system may require permission from the user prior to adjusting the sensitivity to ensure that the user is comfortable with the sensitivity adjustment. The sensitivity adjustment is not limited to the kitchen. A similar sensitivity adjustment based on use of the silence switch may occur in a bathroom due to humidity/temperature increases responsive to the user taking a shower at a certain time of day, or in any other room of the house where false alarms routinely occur.

The detection systems described herein can also include microphones within the nodes to monitor noises within a building. As one example, the system can be used to monitor and detect potential problems with elderly individuals based on sounds. For example, a loud noise (e.g., bang, crash, etc.) in the middle of the night may be an indication that an elderly individual has fallen out of bed, fallen down on the way to the restroom, etc. As a result of such a noise, the system can send a notification to an individual responsible for caring for the elderly individual, such as a relative, a nursing home custodian, etc. The occupancy detection functionality of the detection system can also be used to detect if an elderly individual unexpectedly leaves his/her room and send a notification to one or more individuals caring for the elderly individual.

In an embodiment in which the detection system includes video capabilities, the system may also use biometric monitoring in conjunction with occupancy detection to identify what individuals enter and leave the building. The biometric monitoring can be implemented through retinal detection as known to those of skill in the art. Retinal scans can be taken of individuals that live at, work in, or otherwise regularly enter the building. As such, in addition to identifying a number of occupants in the building or in a portion of the building, the system can also identify which individuals are in the building. The system can also identify individuals who are not regularly in the building if their retinal scan does not match any stored retinal scan information. In one embodiment, a notification can be sent to a user if an individual with an unknown retinal pattern enters the building. This may be an indication of a burglar or of unwanted individuals in the building.

The detection system can further be configured to tie into existing systems of the building such that lights can be remotely controlled, doors can be locked/unlocked, a garage door can be opened/closed, etc. For example, the system can be configured to send wireless signals to a garage door opener such that a user can remotely open/close the garage door. The system can also be integrated into the building's electrical system to control lights, electronic door locks, and/or any other electronic components of the building.

Processor 412 can also be used to monitor and track the use of sensor unit 400 such that a report can be created, stored, and/or conveyed to a provider. As an example, the report can include a time, location, and likelihood of a risk factor for each potential risk factor that is identified by sensor unit 400. The report can also include any commands received from the user of sensor unit 400, any information received from outside sources and conveyed to the user through sensor unit 400, etc. The report can be stored in memory 414. The report can also be conveyed to the insurance provider server.

In addition to determining whether a risk condition is detected and/or a likelihood that the detection is accurate, sensor unit 400 can also determine whether a detected occupant is a human or an animal (i.e., dog, cat, rat, etc.) using infrared pattern analysis based on information received from infrared detector 406 and/or audible sound analysis based on information received from microphone detector 404. Sensor unit 400 can also use detected information and pattern analysis to determine and convey a number of persons or animals detected and/or whether detected persons are moving, stationary, sleeping, etc. In one embodiment, sensor unit 400 can also use temperature detection through infrared detector 406 and/or any of the other detection methods to help determine and convey whether a detected occupant is dead or alive.

In one embodiment, a separate signal acquisition circuit can be used to detect/receive signals for each of gas detector 402, microphone detector 404, infrared detector 405, scent detector 408, and ultrasonic detection system 410. Alternatively, one or more combined signal acquisition circuits may be used. Similarly, a separate algorithm can be used to process signals detected from each of gas detector 402, microphone detector 404, infrared detector 406, scent detector 408, and ultrasonic detection system 410. Alternatively, one or more combined algorithms may be used.

The one or more algorithms used by processor 412 can include computer-readable instructions and can be stored in memory 414. Memory 414 can also be used to store present occupancy information, a layout or map of a structure, occupancy pattern information, etc. User interface 416 can be used to receive inputs from a user for programming and use of sensor unit 400. In one embodiment, user interface 416 can include voice recognition capability for receiving audible commands from the user. Output interface 418 can include a display, one or more speakers, and/or any other components through which sensor unit 400 can convey an output regarding whether a risk condition is detected, etc. Power source 420 can be a battery and/or any other source for powering sensor unit 400.

Transceiver 422 can be used to communicate with sensors and/or servers. As such, sensor unit 400 can receive present information and/or pattern information from the sensors. Sensor unit 400 can use the present sensor information and/or occupancy pattern information to help determine a likelihood that they risk condition exists in an area of the structure. For example, the pattern information may indicate that there is generally a large number of people in a given area at a given time. If used in the given area at or near the given time, the risk-event detection algorithms used by sensor unit 400 may be adjusted such that any indication of risk is more likely to be attributed to an actual risk condition. The present risk information can be similarly utilized. Transceiver 422 can also include short range communication capability such as Bluetooth™, Zigbee™, etc. for conveying information to insurance servers through such wireless paths.

Global positioning system unit 424 can be used to determine a current location of sensor unit 400 so that sensor unit 400 can determine the location of received sensor readings. Then, when a risk condition is determined from the sensor readings, sensor unit 400 may determine and/or communicate the location of each determined risk condition.

In some cases, the system may alert property owners, residents, or others with suggestions to better maintain the property. For example, the detection of hail could also generate automated messages to home inspectors, providing a rapid customer interaction. Hail detection in an area or neighborhood could also prompt the system to send text warning messages alerting insurance customers to move their vehicles indoors. The outdoor wind speed and direction sensor could also be used to improve conditions during the heating season. Under high wind conditions, homes tend to cool much quicker than on calm, sunny days. As such, the user may be provided with a suggestion to open/close windows to improve heating/cooling of the building. Further, by collecting and analyzing internal and external environmental conditions including wind speed, sunlight intensity, humidity, and external temperature, the home temperature could be regulated much more efficiently to save energy. Further, detecting high levels of humidity over long period of times may be indicative of broken water pipes within a building's walls, leading to mold development. Sensing persistent, elevated levels of humidity could warn the homeowner prior to the onset of mold. An indoor freeze sensor can also be used to warn a homeowner that the heating system is not working and that water pipes may be at risk of freezing and bursting.

In one embodiment, the system determines a severity of a sensed condition. The severity may be based at least in part on a rate of change (or spread rate) of the sensed condition. As an example, a condition may be detected at a first sensory node. The rate of change can be based on the amount of time it takes for other sensory nodes to sense the same condition or a related condition. If the other sensory nodes rapidly sense the condition after the initial sensing by the first sensory node, the system can determine that the condition is severe and rapidly spreading. As such, the severity of a sensed condition can be based at least in part on the rate at which the sensed condition is spreading. Detected occupancy can also be used to determine the severity of a sensed condition. As an example, a sensed condition may be determined to be more severe if there are any occupants present in the structure where the condition was sensed.

The type of sensed condition may also be used to determine the severity of a sensed condition. As an example, sensed smoke or heat indicative of a fire may be determined to be more severe than a sensed gas such as carbon monoxide, or vice versa. The amount of dispersion of a sensed condition may also be used to determine the severity of the sensed condition. In one embodiment, known GPS locations associated with each of the sensory nodes that have sensed a condition can be used to determine the dispersion of the condition. As an example, if numerous sensory nodes spread out over a large area detect the sensed condition, the system can determine that the severity is high based on the large amount of dispersion of the sensed condition. In one embodiment, the GPS locations associated with each of the nodes can be fine-tuned using wireless triangulation as known to those of skill in the art. As an example, a first node may be considered to be at location zero, and locations of all of the other nodes in the building/structure can be relative to location zero. Using wireless triangulation techniques, the relative signal strength of the nodes can be used to determine the locations of the nodes relative to location zero, and the determined locations can be used to replace and improve the accuracy of the GPS locations originally assigned to the nodes during installation.

The magnitude of the sensed condition can further be used to determine the severity of the sensed condition. As an example, a high temperature or large amount of smoke can indicate a fire of large magnitude, and the system can determine that the severity is high based on the large magnitude. As another example, a large amount of detected carbon dioxide can indicate a high risk to occupants and be designated a risk condition of high severity.

In an illustrative embodiment, the determination of whether a sensed condition has high severity can be based on whether any of the factors taken into consideration for determining severity exceed a predetermined threshold. As an example, a determination of high severity may be made based on the spread rate if a second sensory node detects the sensed condition (that was originally detected by a first sensory node) within 4 seconds of detection of the sensed condition by the first sensory node. Alternatively, the spread rate threshold may be 0.4 seconds, 1 second, 3 seconds, 10 seconds, etc. As another example, the high severity threshold for occupancy may be if one person or pet is detected in the building, if one person or pet is detected within a predetermined distance of the sensory node that sensed the condition, etc. With respect to magnitude, the high severity threshold may be if the temperature is greater than 140 degrees Fahrenheit (F), greater than 200 degrees F., greater than 300 degrees F., etc. The magnitude threshold may also be based on an amount of smoke detected, an amount of gas detected, etc. The high severity threshold with respect to dispersion can be if the sensed condition is detected by two or more sensory nodes, three or more sensory nodes, four or more sensory nodes, etc. The high severity threshold with respect to dispersion may also be in terms of a predetermined geographical area. As an example, the system may determine that the severity is high if the detection condition has dispersed an area larger than 100 square feet, 200 square feet, etc. The system may also determine that the severity is high if the detection condition has dispersed through at least two rooms of a structure, at least three rooms of the structure, etc.

In some embodiments, the sensitivity of one or more sensory nodes may be adjusted. Sensitivity can refer to the rate at which a sensory node scans its environment for smoke, gas such as carbon monoxide, temperature, occupancy, battery power, ambient light, etc. Examples of sensitivity can be scanning twice a second, once a second, once every 4 seconds, once every 30 seconds, once a minute, once an hour, etc. As indicated above, in one embodiment, the system may adjust the sensitivity of one or more sensory nodes based on the severity of a sensed condition. As also described above, severity can be determined based on factors such as the rate of change of the sensed condition, detected occupancy, the type of sensed condition, the amount of dispersion of the sensed condition, the magnitude of the sensed condition, etc. As an example, smoke may be detected at a sensory node X, and sensory node X can transmit an indication that smoke was detected to a decision node and/or a remote server. If the decision node and/or remote server determine that the sensed condition has high severity, the system can increase the sensitivity of the sensory node X and/or sensory nodes Y and Z in the vicinity of sensory node X such that the scan rate for these nodes increases. The increased sensitivity can also result in a higher communication rate such that the decision node and/or remote server receive more frequent communications from sensory nodes X, Y, and Z regarding sensor readings. The increased sensitivity may also result in a reduction in one or more predetermined thresholds that the system uses to determine if a sensed condition has high severity, to determine if the sensed condition triggers a notification, etc.

The sensitivity of sensory nodes can also be adjusted if any sensory node detects a condition, regardless of the severity of the condition. As an example, the system may automatically increase the sensitivity of sensory nodes Y and Z (which are in the vicinity of sensory node X) if sensory node X detects a condition. The system may also increase the sensitivity of all sensory nodes in a building/structure if any one of the sensory nodes in that building/structure senses a condition. In one embodiment, in the event of an alternating current (AC) power failure, the sensitivity of sensory nodes may be decreased to conserve battery power within the sensory nodes. Similarly, in embodiments where AC power is not present, the system may decrease the sensitivity of any nodes that have low battery power.

The sensitivity of sensory nodes may also be controlled based on a location of the sensory node and/or a learned condition relative to the sensory node. For example, a sensory node in a kitchen or in a specific location within a kitchen (such as near the oven/stovetop) may have higher sensitivity than sensory nodes located in other portions of the structure. The sensitivity may also be higher in any sensory node where a condition has been previously detected, or in sensory nodes where a condition has been previously detected within a predetermined amount of time (e.g., within the last day, within the last week, within the last month, within the last year, etc.). The sensitivity may also be based on occupancy patterns. For example, the sensitivity of a given sensory node may be lower during times of the day when occupants are generally not in the vicinity of the node and rose during times of the day when occupants are generally in the vicinity of the node. The sensitivity may also be raised automatically any time that an occupant is detected within the vicinity of a given sensory node.

The sensitivity of a sensory node may also be increased in response to the failure of another sensory node. As an example, if a sensory node X is no longer functional due to loss of power or malfunction, the system can automatically increase the sensitivity of nodes Y and Z (which are in the vicinity of node X). In one embodiment, the system may increase the sensitivity of all nodes in a building/structure when any one of the sensory nodes in that building/structure fails. In another embodiment, the system may automatically increase the sensitivity of one or more nodes in a building/structure randomly or as part of a predetermined schedule. The one or more nodes selected to have higher sensitivity can be changed periodically according to a predetermined or random time schedule. In such an embodiment, the other nodes in the building/structure (e.g., the nodes not selected to have the higher sensitivity) may have their sensitivity lowered or maintained at a normal sensitivity level, depending on the embodiment.

Figure 5:
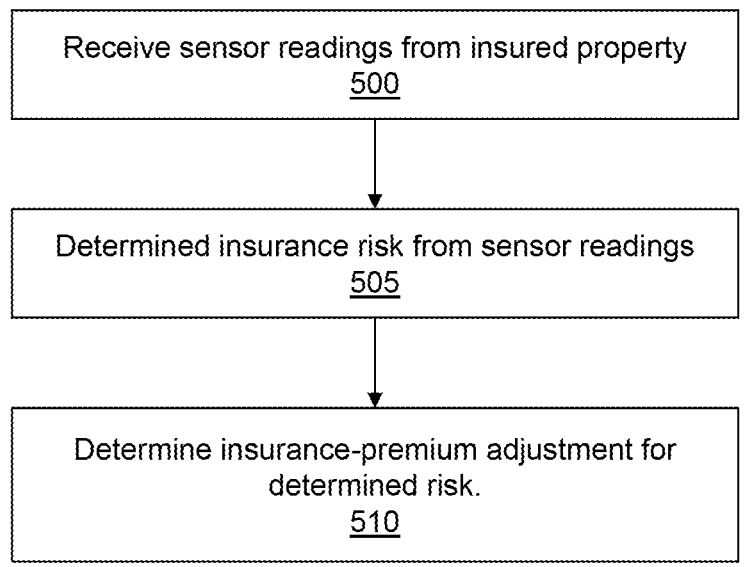
FIG. 5 is a flow diagram illustrating operations performed by a sensory node in accordance with an illustrative embodiment.

FIG. 5 is a flow diagram illustrating operations performed by a detection system in accordance with an illustrative embodiment. In alternative embodiments, additional, fewer, and/or different operations may be performed. Further, the use of a flow diagram is not meant to be limiting with respect to the order of operations performed. Any of the operations described with reference to FIG. 5 can be performed by one or more sensory nodes and/or by one or more decision nodes.

In an operation 500, sensor readings are received from sensors at the insured property. The sensor readings may be received at sensory/decision nodes, such as nodes 105-130 and 200, or it may be received by insurance servers and systems, such as server 300. The sensor readings may be received over network interfaces, either wired or wireless, and may be in the form of digital or analog electronic signals. The sensor readings may be raw/unprocessed data and sensor signals, or it may be processed prior to being received. For example, a signal may be processed, so that only a significant portion of the signal (e.g., signal above a threshold value, signal changing significantly, etc.) is transmitted. As another example, a node may include an indication of a typical or non-risk sensor reading for comparison with the new sensor readings for the property. In an illustrative example, the sensor readings may also contain indications of the type of sensor from which the readings are received, the location of the sensor, and time/date associated with the sensor readings, among other example, information.

In some implementations, sensor readings may be received periodically. In such a case, the frequency of received readings may be high enough to provide substantially real-time readings or low enough to provide very low data transfer while keeping a server up to date. In other implementations, readings may be received only in response to particular circumstances. For example, sensors/sensory nodes may be programmed to only send readings when the readings reached a certain threshold level (e.g., a certain temperature, a concentration of the gas, a raised humidity for particular amount of time, etc.). As another example, sensor/sensory nodes may be programmed to send readings only response to receiving a request for the readings. In some cases in which readings are not sent periodically, sensors may send all the readings collected since a last transmission occurred. In other cases, sensors may only send the most recent readings.

In an operation 505, an insurance risk is determined from the sensor readings. Insurance risk may be determined by a sensory node/decision node at or near the insured property and/or it may be determined by systems are servers of the insurance company. If the risk is determined at least in part by a local node, then a determined risk may be sent to the insurance company rather than sensor readings/information. Sending risk determinations rather than sensor readings may help in reducing resources needed for the transmission and may provide an extra layer of privacy for occupants. On the other hand, receiving sensor readings in full at the insurance company may help the insurer to better assess the risk of conditions at the property.

In some cases, insurance risks may be associated with the occupancy or lack of occupancy of certain rooms/areas of a property. For example, if certain areas of the property are not occupied for long periods of time, then in the damage occurring in those areas will be greatly increased due to the lack of human intervention. In some instances, the lack of occupancy may also lead to reduced climate control usage, which can cause damage to the property during seasons of extreme temperature. As another example, areas that are heavily trafficked in use may be at greater risk for damage from the many occupants of the areas. In some cases, an insurer may have received intended occupancy information at the start of the insurance plan, and therefore may compare the intended occupancy with the actual occupancy. For instance, if the property owner discloses that two people and no animals would be living in a residence, then detecting an actual occupancy of four people and two dogs for an extended period may indicate an increased risk than previously quoted. As another example, if all of the residents of the property are away from home for more than half of the day, then the property may be at reduced risk because the residents have less time to cause damage to the property.

In some cases, insurance risks may be associated with gases or other chemical compounds detected in the ambient air by a gas detector 402, scent detector 408, or a humidity detector. For example, an overabundance of toxic gases such as carbon monoxide, carbon dioxide, methane may pose a serious problem to occupants of property, leaving an insurer open to liability risk. Additionally, a humidity sensor reading indicating an extended period of time with high water content in the air may leave the property open to growth of mold, which can both produce disease-inducing spores and damage wooden/plaster structural components. Further, readings from scent detector 408 that indicate the presence of incendiary or controlled narcotic substances at the property may likewise indicate increased risk.

In some cases, insurance risks may be associated with user actions related to sensor equipment. For example, if occupants of the property frequently leave smoke detectors or other sensors unplugged/turned off, then the property and occupants are at increased risk. As another example, if sensor systems are turned to a very low sensitivity setting, then the usefulness of these sensors may be reduced and, therefore, risk increased. As still another example, the sensor node may connect to other systems in the property, such as burglar alarms, security devices, or panic alarms, and detect the increased risk associated with these systems being deactivated.

Some major damage events, such as fire, flood, and storm damage may also be detected as insurance risks. For example, smoke detectors may sense a fire, or a near fire, occurring in a property, regardless of whether the property owner reports the incident to the insurance company. As another example, although flood damage is not normally covered by private insurance, detection of flooding may be indicative of other large insurance risks to the property. As yet another example, a hail sensor, or wind sensor may detect how often severe storm events occur at the residence and the damage done by such storms.

In addition to simply detecting the occurrence of major damage events as insurance risks, a decision node or insurance server may determine that a property is at increased risk of damage because of interesting weather patterns in the area of the property. For example, pattern recognition software may be used to determine property locations that receives the highest incidences of, for example, lightning strikes, severe wind events, earthquakes, wildfires, hail storms, severe thunderstorms, flooding, snow damage, etc. Such pattern recognition may also be useful in predicting property locations that are at higher risk for other insurance damage claims as well, such as burglary, animal infestations, arson, vandalism, rapid depreciation, issues with utilities, or higher incidence of lawsuits, among other examples.

Further still, sensors and property may detect structural issues with the property as they occur. For example, stress/strain sensors may be placed on load bearing structural components to report when damaging tension, torsion, or compression is placed on these important components of the property. Additionally, movement sensors may also detect if structural components move out of their original positions, indicating weakening and breaking of the building. In addition to such sensors providing the insurance provider or property owner with an early warning to correct such problems, the factors leading to such structural problems may also be analyzed to yield a predictive model for risk factors. For example, if many structural defects are found in constructions by a certain company, constructions using certain materials, buildings in a particular area, buildings constructed at or before a certain time, or buildings that have a particular design feature (e.g., unique layout, open floorplan, pentagonal rooms, etc.), then an insurance provider can charge a higher premium for those properties which fit the pattern. Correspondingly insurance company may lower premiums for buildings that do not fit the pattern or that fit a pattern for low structural defects.

In some cases, risk factors may include particular actions of occupants in the property. For example, an insurance risk may be that occupants often produce smoke alarm events (e.g. they burn a pizza every Thursday night). As another example, if occupants leave appliances running (e.g., oven, space heater, fans, stove, sink, etc.) while they are unattended or not being used, this inattention may represent an insurance risk. As a further example, in the case that the sensor system provides recommendations to occupants, it may represent an insurance risk. If occupants do not heed those suggestions. For instance, if the property owner leaves their car out of the garage after having received and read an alert warning of approaching hail, then such an owner may be hazardous to the property, increasing insurance risk.

Many possible insurance risks may be determined from the sensors and systems discussed above and the foregoing set of examples are not intended as comprehensive and full. Rather, various other examples of insurance risks will be evident to those of skill in the art.

In operation 510, an insurance premium adjustment is determined for the determined risk. Premium adjustment may be made with respect to the current insurance premium charged for the property (e.g., reduction by a percentage of current premium payment, reduction by a particular dollar value, etc.). Premium adjustment may alternately be made with respect to a set premium value (e.g., a typical value for a type of property, a median premium value for all property plans, etc.). In still other embodiments, a premium adjustment may simply be a new value of premium for the property, rather than an adjustment to any other level of premium payment.

In some cases, an adjustment to the insurance premium may increase the premium amount. For example, if more frequent and/or more severe risks are detected at the insured property than in similar properties, then the insurance provider may raise the insurance premiums for that plan to compensate for the increased risk. In other cases, an adjustment to insurance premium may reduce the premium amount. For example, if less frequent and/or much less severe risk conditions are detected at a property than are typically detected in a similar type of property, then the insurance provider may offer a reduced insurance premium rate to compensate for the detected safety of the insured property.

In some embodiments, the insurance provider may design the premium adjustment system such that only reductions in premium amount are allowed. For example, in such a system a property that is detected to have a higher than normal risk may simply yield no offers for lowered insurance premiums, while lower-risk plans may yield lower premium offers.

Since the risk values determined from the sensor readings may include many complex factors, and combinations of factors, the discount algorithm may apply principal component analysis (PCA), and other mathematical scoring and statistical analysis techniques to produce a reasonable risk assessment. Such an assessment may produce a property risk score indicating the relative risk associated with the particular property, based on the analyzed sensor readings, with respect to other properties in the system. In cases where the node analyzes the data, and determines the risk score before transmitting to the insurance servers, the PCA and other scoring techniques may be applied at the node and the composite property risk score may be transmitted directly to the insurance server, without needing to transmit other data.

In some cases, an insurance premium adjustment is determined based on the severity of detected risk conditions. In one embodiment, the system can prioritize the sensed condition based at least in part on the severity. A sensed condition with high severity may be prioritized higher than a sensed condition with low severity. In one embodiment, the priority can be provided to the insurance provider as an indication of the urgency of the sensed condition. The severity can also be used by the system to help determine whether a sensed condition is a false alarm. A sensed condition with a high severity can be determined to be an actual detection condition and the system can trigger the appropriate alarms, notifications, etc. In one embodiment, the severity of a sensed condition may also be used to control the sensitivity of the sensory node that sensed the condition and other sensory nodes in the vicinity of the sensory node that sensed the condition.

After insurance risks and premium price adjustments are determined, status information regarding the sensory nodes will continue to be received from the sensory nodes. In an illustrative embodiment, the sensory nodes periodically provide status information to the decision node and/or remote server. The status information can include an identification of the sensory node, location information corresponding to the sensory node, information regarding battery life of the sensory node, information regarding whether the sensory node is functioning properly, information regarding whether any specific sensors of the sensory node are not functioning properly, information regarding whether the speaker(s) of the sensory node are functioning properly, information regarding the strength of the communication link used by the sensory node, etc. In one embodiment, information regarding the communication link of a sensory node may be detected/determined by the decision node and/or remote server. The status information can be provided by the sensory nodes on a predetermined periodic basis. In the event of a problem with any sensory node, the system can alert a system administrator (or user) of the problem. The system can also increase the sensitivity of one or more nodes in the vicinity of a sensory node that has a problem to help compensate for the deficient node. The system may also determine that a node which fails to timely provide status information according to a periodic schedule is defective and take appropriate action to notify the user and/or adjust the sensitivity of surrounding nodes.

Additional information regarding a risk condition can also include statistics regarding the condition. The statistics can include a heat rise at the structure in terms of degrees per time unit (e.g., 40 degrees F./second), a smoke rise at the structure in terms of parts per million (ppm) per time unit (e.g., 2000 ppm/second), and/or a gas rise such as a carbon monoxide level increase. The heat rise, smoke rise, and/or gas rise can be provided textually and/or visually through the use of a graph or chart. The statistics can also include a heat magnitude and/or smoke magnitude. The statistics can also include one or more locations of the dwelling where occupants were last detected, whether there is still AC power at the location, whether communication to/from the sensory nodes is still possible, whether there is any ambient light at the location, etc. In an illustrative embodiment, any of the statistics may be associated with a timestamp indicative of a time of the measurements, etc. that the statistic is based on.

The additional information regarding a risk condition can also include maps. The maps may include a street map of the area surrounding the location at which the detection condition was sensed, a map that illustrates utility locations and fire hydrants proximate to the location at which the detection condition was sensed, an overhead satellite view showing the location at which the detection condition was sensed, a map showing neighborhood density, etc. The additional information may also include a weather report and/or predicted weather for the location at which the detection condition was sensed. The maps and/or weather information can be obtained from mapping and weather databases as known to those of skill in the art.

The additional information regarding a risk condition can also include pictures of the interior and/or exterior of the structure. The pictures can include one or more views of the home exterior, illustrating windows, doors, and other possible exits and/or one or more views of the lot on which the structure is located. The pictures can also include one or more interior views of the structure such as pictures of the kitchen, pictures of the bathroom(s), pictures of the bedroom(s), pictures of the basement, pictures of the family room(s), pictures of the dining room(s), etc. The pictures can further include blueprints of the structure. The blueprints can illustrate each floor/level of the structure, dimensions of rooms of the structure, locations of windows and doors, names of the rooms in the structure, etc. In one embodiment, construction information may be included in conjunction with the pictures. The construction information can include the type/composition of the roof, the type of truss system used, the type of walls in the structure, whether there is a basement, whether the basement is finished, whether the basement is exposed, whether the basement has egress windows, the type(s) of flooring in the structure, the utilities utilized by the structure such as water, electricity, natural gas, etc., the grade of the lot on which the structure is located, etc.

In one embodiment, the system can also generate an investigation page that illustrates statistics relevant to an event investigation. The investigation page can include information regarding what was detected by each of the sensory nodes based on location of the sensory nodes. The detected information can be associated with a timestamp indicating the time that the detection was made. As an example, an entry for a first sensory node located in a kitchen 7:00 pm can indicate a detected smoke level at 7:00 pm, a detected temperature at 7:00 pm, a detected carbon monoxide level at 7:00 pm, a detected number of occupants at 7:00 pm, etc. Additional entries can be included for the first sensory node at subsequent times such as 7:01 pm, 7:02 pm, 7:03 pm, etc. until the detection condition is resolved or until the first sensory node is no longer functional. Similar entries can be included for each of the other nodes in the structure. The entries can also indicate the time at which the system determined that there is a risk condition, the time at which the system sends an alert to emergency responders and/or an emergency call center, the time at which emergency responders arrive at the scene, etc.

The investigation page may also include textual and/or visual indications of smoke levels, heat levels, carbon monoxide levels, occupancy, ambient light levels, etc. as a function of time. The investigation page can also include diagnostics information regarding each of the sensory nodes at the structure. The diagnostics information can include information regarding the battery status of the node, the smoke detector status of the node, the occupancy detector status of the node, the temperature sensor status of the node, the carbon monoxide detector status of the node, the ambient light detector status of the node, the communication signal strength of the node, the speaker status of the node, etc. The diagnostic information can also include an installation date of the system at the structure, a most recent date that maintenance was performed at the structure, a most recent date that a system check was performed, etc. The investigation page can also include a summary of the detection condition that may be entered by an event investigator.

The investigation page may be used by the insurance provider in the event that a claim for damage. For example, occupancy information may indicate possible sources of the damage and may be indicative of whether a particular party is at fault. Such a use may reduce spurious claims from being filed to the provider or may reduce the number of spurious claims that are honored by the provider.

In one embodiment, one or more of the sensory nodes in a structure can include a video camera that is configured to capture video of at least a portion of the structure. Any type of video camera known to those of skill in the art may be used. In one embodiment, the video captured by the video camera can be sent to a remote server and stored at the remote server. To reduce the memory requirements at the remote server, the remote server may be configured to automatically delete the stored video after a predetermined period of time such as one hour, twelve hours, twenty-four hours, one week, two weeks, etc. A user can log in to the remote server and view the video captured by any one of the sensory nodes. As such, when the user is away from home, the user can check the video on the remote server to help determine whether there is a risk condition. Also, when the user is on vacation or otherwise away from home for an extended period of time, the user can log in to the remote server to make sure that there are no unexpected occupants in the structure, that there are no unauthorized parties at the structure, etc. The stored video can also be accessible to emergency responders, emergency call center operators, event investigators, etc. In one embodiment, in the event of a risk condition, the video can be streamed in real-time and provided to emergency responders and/or emergency call center operators when they log in to the system and view details of the detection condition. As such, the emergency responders and/or emergency call center operators can see a live video feed of the detection condition. The live video feed can be used to help determine the appropriate amount of resources to dispatch, the locations of occupants, etc.

The user can also access system integrity and status information through the user interface. The system integrity and status information can include present battery levels, historic battery levels, estimated battery life, estimated sensor life for any of the sensors in any of the sensory nodes, current and historic AC power levels, current and historic communication signal strengths for the sensory nodes, current and historic sensitivity levels of the sensory nodes, the date of system installation, the dates when any system maintenance has been performed and/or the type of maintenance performed, etc. The system information accessible through the user interface can further include current and historic levels of smoke, heat, carbon monoxide, ambient light, occupancy, etc. detected by each of the sensory nodes.

The system can also provide the user with weekly, monthly, yearly, etc. diagnostic reports regarding system status. The reports may also be provided to emergency response departments such as a fire department and an insurance provider that insure the user's home. The system can also send reminders to the user to perform periodic tests and/or simulations to help ensure that the system is functional and that the user stays familiar with how the system operates. In one embodiment, users may receive an insurance discount from their insurance provider only if they run the periodic tests and/or simulations of the system. The system can also send periodic requests asking the user to provide any changes to the information provided during installation. Examples of information that may change can include an addition to the structure, additional occupants living at the structure, a new pet, the death of a pet, fewer occupants living at the structure, a change in construction materials of the structure such as a new type of roof, new flooring, etc.

Figure 6:
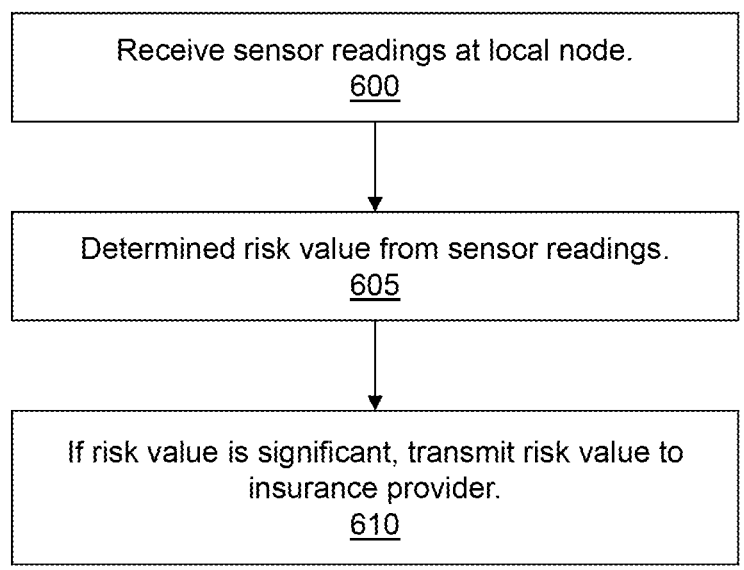
FIG. 6 is a flow diagram illustrating operations performed by an insurance server in accordance with an illustrative embodiment.

FIG. 6 is a flow diagram illustrating operations performed by a node in accordance with an illustrative embodiment. In alternative embodiments, additional, fewer, and/or different operations may be performed. Further, the use of a flow diagram is not meant to be limiting with respect to the order of operations performed. Any of the operations described with reference to FIG. 6 can be performed by one or more sensory nodes and/or by one or more decision nodes.

In an operation 600, sensor readings are received at a sensory or decision node. In some cases, the node may be local to an insured property. In operation 605, the node determines a risk value based on the sensor readings. For example, the risk value may be determined in the same way as described above with regard to the insurance risk determined by the insurance server in operation 505 of FIG. 5. The risk value may be associated with a particular sensor reading or it may be associated with a particular type of risk. If the risk value is associated with a type of sensor, then multiple risk values may be determined if multiple sensor readings have been received at the node. If the risk value is associated with a type of insurance risk, then each individual sensor reading may account for more than one assessed risk value and/or more than one sensor reading may be combined to account for a single risk value.

In operation 610, the node determines if the risk value is significant enough to send on to the insurance provider and, if the value is significant, the node transmits an indication of the risk value to the insurance provider. In some cases, the indication of the risk value may simply be the sensor readings received at the node. In other cases, one or more determined values of risk may be transmitted from the node the insurance provider. In such a case, a node may receive instructions from the insurance provider instructing the node on how to determining the risk value. In some cases, the indication of the risk value may be further processed prior to sending. For example, the risk value may be converted to a hash value in order to preserve privacy. In such a case, the insurance provider only receives the necessary risk assessment indications rather than a full explanation of how those risks were assessed or the sensor readings from which they were assessed. In still other cases, the insurance provider may provide the algorithms necessary for determining the insurance premium adjustment directly at the node. In such cases, the node may determine the insurance premium adjustment and transmit the determined adjustment to an insurance server rather than requiring the insurance server to analyze the transmitted risk values to determine the adjustment. In this way, the local device may serve to determine a premium discount and the insurance server merely applies that discount to the associated insurance plan.

To determine whether the risk value is significant, the node may store one or more pre-determined risk values with which to compare the determined current risk values. In the case where multiple risks are assessed and multiple risk values determined, a different predefined threshold risk value may be stored at the node for use in determining whether to transmit each type of risk value to the insurance provider. When the risk value is determined, the node may then compare the determined risk value to the stored threshold value associated with that type of risk and, if the comparison satisfies a particular comparison condition (e.g., greater than a threshold value, within 10% of the threshold value, less than a threshold value, etc.), then the node transmits the indication of the risk value to insurance provider systems.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for monitoring a property, the method comprising:
    continuously receiving, at a plurality of sensory nodes, digital sensor data from a plurality of digital sensors;
    receiving wirelessly, at a computing device, digital sensor data that indicates a condition of a property;
    continuously receiving occupancy data from an occupancy sensor, the occupancy data including a type of occupant selected from at least one of human or animal, wherein the condition of the property is affected at least in part by one or more occupants of the property, and wherein the sensor data is received from the plurality of sensory nodes that are each configured to monitor the condition of the property at respective locations within the property;
    assessing in real-time, by the computing device, a rate of change of a sensed condition based on the sensor data received from the plurality of sensory nodes, wherein assessing the rate of change comprises comparing the sensor data from at least two sensory nodes configured to monitor different locations within the property;
    determining, by the computing device, a severity of the sensed condition based on the sensor data and the rate of change of the sensed condition within the property;
    determining, by the computing device, a continuously adjusted risk based on the severity of the sensed condition and a previously determined risk;
    modifying a frequency of activation of at least one of the plurality of sensor nodes based on the adjusted risk and an occupancy pattern of the property derived from the occupancy data;
    comparing, by the computing device, the adjusted risk and a threshold risk; and
    notifying a user, via a user interface, of the condition of the property based on a result of the comparing the adjusted risk and the threshold risk.

2. The method of claim 1, wherein said notifying the user includes providing a recommendation to reduce the adjusted risk.

3. The method of claim 2, wherein the recommendation includes a change of behavior of the occupant.

4. The method of claim 2, wherein the recommendation includes suggested maintenance of the property.

5. The method of claim 1, wherein said notifying the user includes providing to the user a report including a time, a location, and the adjusted risk.

6. The method of claim 1, wherein the previously determined risk was determined based on a plurality of sensor data, each sensor data indicating a condition of the property at a different time.

7. A system comprising:
a plurality of electronic sensory nodes configured to continuously monitor conditions of a property at respective locations within the property and at least one occupancy sensor which continuously monitors the property for occupancy, wherein the conditions of the property are affected at least in part by one or more occupants of the property; and
a computing device configured to:
receive wirelessly, from the sensory node, digital sensor data from the plurality of sensory nodes that indicates the condition of the property,
receive from the at least one occupancy sensor, occupancy data, the occupancy data including a type of occupant selected from at least one of human or animal;
assess in real-time a rate of change of a sensed condition based on the sensor data from the plurality of sensory nodes, wherein assessing the rate of change comprises comparing the sensor data from at least two sensory nodes configured to monitor different locations within the property;
determine a severity of the sensed condition based on the sensor data and the rate of change of the sensed condition within the property;
determine a continuously adjusted risk based on the severity of the sensed condition and a previously determined risk;
modify a frequency of activation of at least one of the plurality of sensory nodes based on the adjusted risk and an occupancy pattern of the property derived from the occupancy data;
compare the adjusted risk and a threshold risk; and
notify, via a user interface, a user of the condition of the property based on a result of the comparing the adjusted risk and the threshold risk.

8. The system of claim 7, wherein to notify the user, the computing device is configured to provide a recommendation to reduce the adjusted risk.

9. The system of claim 8, wherein the recommendation includes a change of behavior of the occupant.

10. The system of claim 8, wherein the recommendation includes suggested maintenance of the property.

11. The system of claim 7, wherein to notify the user, the computing device is configured to provide to the user a report including a time, a location, and the adjusted risk.

12. The system of claim 7, wherein the previously determined risk was determined based on a plurality of sensor data, each sensor data indicating a condition of the property at a different time.

13. The system of claim 7, wherein the sensor data that indicates the condition of the property includes an indication of an activation state of the sensor data, and wherein to notify the user, the computing device is configured to provide a recommendation to more frequently activate the sensor node.

14. The system of claim 7, wherein the previously determined risk is indicative of a learned normal pattern of the condition of the property, and wherein the adjusted risk indicates an abnormal condition of the property.

15. A non-transitory computer-readable medium having computer-readable instructions stored thereon that, upon execution by a processor, cause a device to perform operations, wherein the instructions comprise:
instructions to continuously receive digital sensor data that indicates a condition of a property;
instructions to continuously receive occupancy data from an occupancy sensor, the occupancy data including a type of occupant selected from at least one of human or animal, wherein the condition of the property is affected at least in part by one or more occupants of the property, and wherein the sensor data is received from a plurality of sensory nodes that are each configured to continuously monitor the condition of the property at respective locations within the property;
instructions to assess in real-time a rate of change of a sensed condition based on the sensor data received from the plurality of sensory nodes, wherein assessing the rate of change comprises comparing the sensor data from at least two sensory nodes configured to monitor different locations within the property;
instructions to determine a severity of the sensed condition based on the sensor data and the rate of change of the sensed condition within the property;
instructions to determine a continuously adjusted risk based on the severity of the sensed condition and a previously determined risk;
instructions to modify a frequency of activation of at least one of the plurality of electronic sensory nodes based on the adjusted risk and an occupancy pattern of the property derived from the occupancy sensor;
instructions to compare the adjusted risk and a threshold risk; and
instructions to notify, via a user interface, a user of the condition of the property based on a result of the comparing the adjusted risk and the threshold risk.

16. The non-transitory computer-readable medium of claim 15, wherein the instructions to notify the user include instructions to provide a recommendation to reduce an adjusted risk that is determined in the future.

17. The non-transitory computer-readable medium of claim 15, wherein the instructions to notify the user include instructions to provide an incentive to reduce an adjusted risk that is determined in the future.

18. The non-transitory computer-readable medium of claim 15, wherein the sensor data that indicates the condition of the property includes an indication of an activation state of the sensor data, and wherein the instructions to notify the user of the condition of the property include instructions to recommend that activation of the sensory node is to be more frequent.

19. The method of claim 1, wherein the occupancy data further includes a number of persons or animals detected by the occupancy sensor.

20. The system of claim 7, wherein the occupancy data further includes a number of persons or animals detected by the occupancy sensor.

* * * * *